Patented Mar. 10, 1936

2,033,657

UNITED STATES PATENT OFFICE 2,033,657

BITUMINOUS EMULSION

Preston R. Smith, Rahway, N. J., assignor to The Barber Asphalt Company, Philadelphia, Pa., a corporation of West Virginia No Drawing. Application January 27, 1934, Serial No. 708,698

15 Claims. (Cl. 134—1)

This invention relates to bituminous emulsions, and more particularly to emulsions of the clay type, dried films of which are rendered resistant to water by the incorporation in the emulsions and in the films resulting therefrom of certain substances.

Emulsions of certain types consisting only of an emulsifying agent, a bitumen and water give dry films which are fairly resistant to the action of water. That is, reemulsification does not tend to take place readily so that surfaces carrying films of the emulsion may be exposed to the weather, i. e. rain or dampness, without substantial effect thereon. On the other hand, various bituminous emulsions, notably those in which clay is used as the emulsifying agent, give films which are very sensitive to the action of water, reemulsification taking place very readily. It has been found that the addition of various substances to such emulsions will render the films substantially unaffected by the action of water.

The present invention relates to bituminous emulsions, particularly of the clay type, in which a material such as bentonite or other colloidal clay or insoluble metallic oxide, hydroxide or silicate having a substantial proportion of particles of a colloidal character is used as the emulsifying agent, in which there is incorporated a substance capable of giving $SiF_6$ ions in aqueous solution, these substances including fluosilicic acid and the fluosilicates generally.

The fluosilicates found most desirable are those of metals falling in the second, third, fifth or sixth analytical groups or the eighth periodic group as given in the seventh edition of Prescott and Johnson's Qualitative Chemical Analysis.

To illustrate the action of the fluosilicates and fluosicilic acid in rendering the films resulting from the emulsion resistant to water, the effects produced by the addition of the various substances in accordance with the present invention will be considered when these substances are added to a basic bituminous emulsion, films of which are destroyed very readily by the application of water. This basic emulsion which will be hereafter discussed is a water emulsion in which bentonite is used as the emulsifying agent and which has the following composition:

Bitumen_____ 45% to 67%, preferably 50%
Bentonite_____ 2% to 10%, preferably 7.5%
Water_____ 35% to 55%, preferably 43.5%

In the following examples where a percentage of salt in the emulsion is given it means that the finished emulsion contains the indicated quantity of the salt.

If fluosilicic acid, $H_2SiF_6$, is incorporated in the above emulsion in amounts ranging from 0.03% to 10%, the resulting films are unaffected by water. The addition of fluosilicic acid thickens the emulsion but does not substantially change the appearance of the dried film over that of the film obtained from the basic emulsion alone.

Ammonium fluosilicate, $(NH_4)_2SiF_6$, when used in a similar fashion in proportions ranging from 0.5% to 10% likewise gives films unaffected by water. By the use of ammonium fluosilicate the emulsion is very markedly thickened while the dried film is dull in appearance. Ammonium fluosilicate is quite soluble in water.

Sodium fluosilicate, $Na_2SiF_6$, used in proportions ranging from 0.06% to 10% gives films resistant to water without however substantially thickening the emulsion. The solubility of sodium fluosilicate in water is very slight. If the salt is not fully dissolved in water prior to the addition of emulsion, the dried film is apt to be granular due to the presence in the film of small discrete particles of the salt. If a saturated solution of a salt, however, is added to the emulsion, then this granular appearance does not result.

Potassium fluosilicate, $K_2SiF_6$, gives results similar to sodium fluosilicate when used in proportions ranging from 0.125% to 10%. Here again the salt is only slightly soluble in water and accordingly to produce a smooth film it must be used in the same fashion as the sodium fluosilicate.

Barium fluosilicate, $BaSiF_6$, is also only slightly soluble and gives results similar to those obtained with sodium fluosilicate when used in proportions ranging from 0.06% to 10%.

Calcium fluosilicate, $CaSiF_6$, acts similarly to the barium salt in proportions ranging from 0.12% to 10%.

Magnesium fluosilicate, $MgSiF_6.6H_2O$, in proportions ranging from 0.5% to 10% gives films unaffected by water. The magnesium salt is very soluble in water and the emulsions are very considerably thickened thereby.

Lead fluosilicate, $PbSiF_6$, in proportions from 0.5% to 10% gives films which are unaffected by water. This salt thickens the emulsion.

Cupric fluosilicate, $CuSiF_6$, in proportions ranging from 0.125% to 1% gives films unaffected by water. This fluosilicate is extremely soluble in water and results in substantial thickening of the emulsion. The dried film under certain conditions is checkered.

Zinc fluosilicate, $ZnSiF_6$, gives films substantially unaffected by water when used in proportions ranging from 0.06% to 1%. The salt is extremely soluble in water and results in a slight thickening of the emulsion.

Ferrous fluosilicate, $FeSiF_6$, used in proportions ranging from 0.2% to 1% gives films which are substantially unaffected by water. The salt is very soluble in water and the emulsions are thickened slightly thereby.

Nickel fluosilicate, $NiSiF_6$, used in the same proportions as the ferrous fluosilicate gives similar results.

From the above it will be seen that dried films of clay emulsions are rendered resistant to water by the addition of very small amounts of substances which in solution give $SiF_6$ ions, these substances not only including the fluosilicates but also fluosilicic acid. In all cases, a fraction of one per cent appears to be substantially effective.

While the above examples are given with reference to an emulsion which gives films of very poor character from the standpoint of water resistance, similar results are found to be given with other clay emulsions. If the basic clay emulsion used is of a character giving films having substantial resistance to water, then it is possible to use much smaller percentages of the added substances to attain complete resistance to washing.

It is to be noted that whereas certain of the salts substantially thicken the emulsion, others do not appear to have this effect. The thickening is apparently caused primarily by those substances which have the greatest solubility.

The various substances can be added to the previously formed emulsion, or may be added to the clay before the asphalt is emulsified thereby. So long as the substance is finally incorporated in the emulsion, it does not seem to be material how the addition thereof is effected.

What I claim and desire to protect by Letters Patent is:

1. An aqueous clay emulsion of bitumen containing a fluosilicate in amount capable of rendering dry films formed from the emulsion substantially resistant to water.

2. An aqueous clay emulsion of bitumen containing a fluosilicate of a metal selected from the group consisting of the metals of the second, third, fifth and sixth analytical groups and the eighth periodic group, the fluosilicate being present in amount capable of rendering dry films formed from the emulsion substantially resistant to water.

3. An aqueous clay emulsion of bitumen containing a fluosilicate of an alkali earth metal, the fluosilicate being present in amount capable of rendering dry films formed from the emulsion substantially resistant to water.

4. An aqueous clay emulsion of bitumen containing sodium fluosilicate in amount capable of rendering dry films formed from the emulsion substantially resistant to water.

5. An aqueous clay emulsion of bitumen containing potassium fluosilicate in amount capable of rendering dry films formed from the emulsion substantially resistant to water.

6. An aqueous emulsion of bitumen containing in solution a compound giving $SiF_6$ ions, the compound being present in amount capable of rendering dry films formed from the emulsion substantially resistant to water.

7. A bituminous coating formed by the evaporation of water from an aqueous clay emulsion of bitumen containing in solution a compound giving $SiF_6$ ions, the coating being substantially resistant to water.

8. A bituminous coating formed by the evaporation of water from an aqueous clay emulsion of bitumen containing a fluosilicate, the coating being substantially resistant to water.

9. A bituminous coating formed by the evaporation of water from an aqueous clay emulsion of bitumen containing a fluosilicate of an alkali earth metal, the coating being substantially resistant to water.

10. A bituminous coating formed by the evaporation of water from an aqueous clay emulsion of bitumen containing sodium fluosilicate, the coating being substantially resistant to water.

11. A bituminous coating formed by the evaporation of water from an aqueous clay emulsion of bitumen containing potassium fluosilicate, the coating being substantially resistant to water.

12. An aqueous clay emulsion of bitumen containing in solution a compound giving $SiF_6$ ions, the compound being present in amount capable of rendering dry films formed from the emulsion substantially resistant to water.

13. A bituminous coating formed by the evaporation of water from an aqueous clay emulsion containing in solution a compound giving $SiF_6$ ions, the coating being substantially resistant to water.

14. A bituminous coating formed by the evaporation of water from an aqueous clay emulsion of bitumen containing a fluosilicate of a metal of the group consisting of the metals of the second, third, fifth and sixth analytical groups and the eighth periodic group, the coating being substantially resistant to water.

15. A bituminous coating formed by the evaporation of water from an aqueous clay emulsion of bitumen containing a fluosilicate of an alkali metal, the coating being substantially resistant to water.

PRESTON R. SMITH.